US009217835B2

(12) United States Patent
Ishiyama et al.

(10) Patent No.: US 9,217,835 B2
(45) Date of Patent: Dec. 22, 2015

(54) PHOTOELECTRIC CONVERSION MODULE AND TRANSMISSION APPARATUS USING THE SAME

(71) Applicant: Hitachi Metals, Ltd., Minato-ku, Tokyo (JP)

(72) Inventors: Kazuo Ishiyama, Tokyo (JP); Yasunobu Matsuoka, Tokyo (JP); Hideo Arimoto, Tokyo (JP); Norio Chujo, Tokyo (JP); Yoshinori Sunaga, Tokyo (JP); Kinya Yamazaki, Tokyo (JP); Yoshiaki Ishigami, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/508,418

(22) Filed: Oct. 7, 2014

(65) Prior Publication Data
US 2015/0098675 A1 Apr. 9, 2015

(30) Foreign Application Priority Data

Oct. 8, 2013 (JP) .................................. 2013-211345

(51) Int. Cl.
*G02B 6/36* (2006.01)
*G02B 6/42* (2006.01)
(52) U.S. Cl.
CPC .............. *G02B 6/4214* (2013.01); *G02B 6/428* (2013.01); *G02B 6/423* (2013.01)
(58) Field of Classification Search
CPC ....... G02B 6/4214; G02B 6/423; G02B 6/428

USPC ................................................ 385/88, 92–94
See application file for complete search history.

(56) References Cited

U.S. PATENT DOCUMENTS

2008/0298818 A1* 12/2008 Epitaux et al. ................ 398/212
2012/0063718 A1 3/2012 Steijer et al.

FOREIGN PATENT DOCUMENTS

JP 2012-60125 A 3/2012

OTHER PUBLICATIONS

"The Latest Technology of Optical Transmitter-Receivers for Optical Interconnect Applications," by Ichiro Ogura, O plus E (Japanese publication), pp. 140-145, Sep. 2007, (Six (6) pages).
(Continued)

*Primary Examiner* — Ryan Lepisto
(74) *Attorney, Agent, or Firm* — Crowell & Moring LLP

(57) ABSTRACT

There is provided a photoelectric conversion module that can be mounted two-dimensionally over a device board in a high-density, low-height manner and cooled efficiently with an easy-to-install collective-type radiator. In the photoelectric conversion module mounted over the device board, an optical connector is attached to that surface of an optical subassembly facing the device board. An electric connector has at least two sides thereof opened so that the optical transmission medium is threaded therethrough and extended through at least two facing sides of the optical subassembly. The optical transmission medium is thus extended between the optical subassembly and the device board in a vertically stacked manner.

14 Claims, 10 Drawing Sheets

(56) References Cited

OTHER PUBLICATIONS

"Avago Fiber Optics: Breaking Bandwidth and Performance Barriers in Supercomputing," The Avago Advantage, Avago Technologies, http://www.avagonow.com/Newsletters/PDFs/EDN_0510_JP_01.pdf, with English translation, (Three (3) pages).

"Fujitsu Laboratories Develops Technology for Compact Optical Transceivers that Double Data Transmission Speeds to 25 Gbps", Fujitsu Laboratories Ltd., Kawasaki, Japan, May 31, 2012, http://pr.fujitsu.com/jp/news/2012/05/31.html, with English translation, (Eleven (11) pages).

* cited by examiner

F I G . 1 1
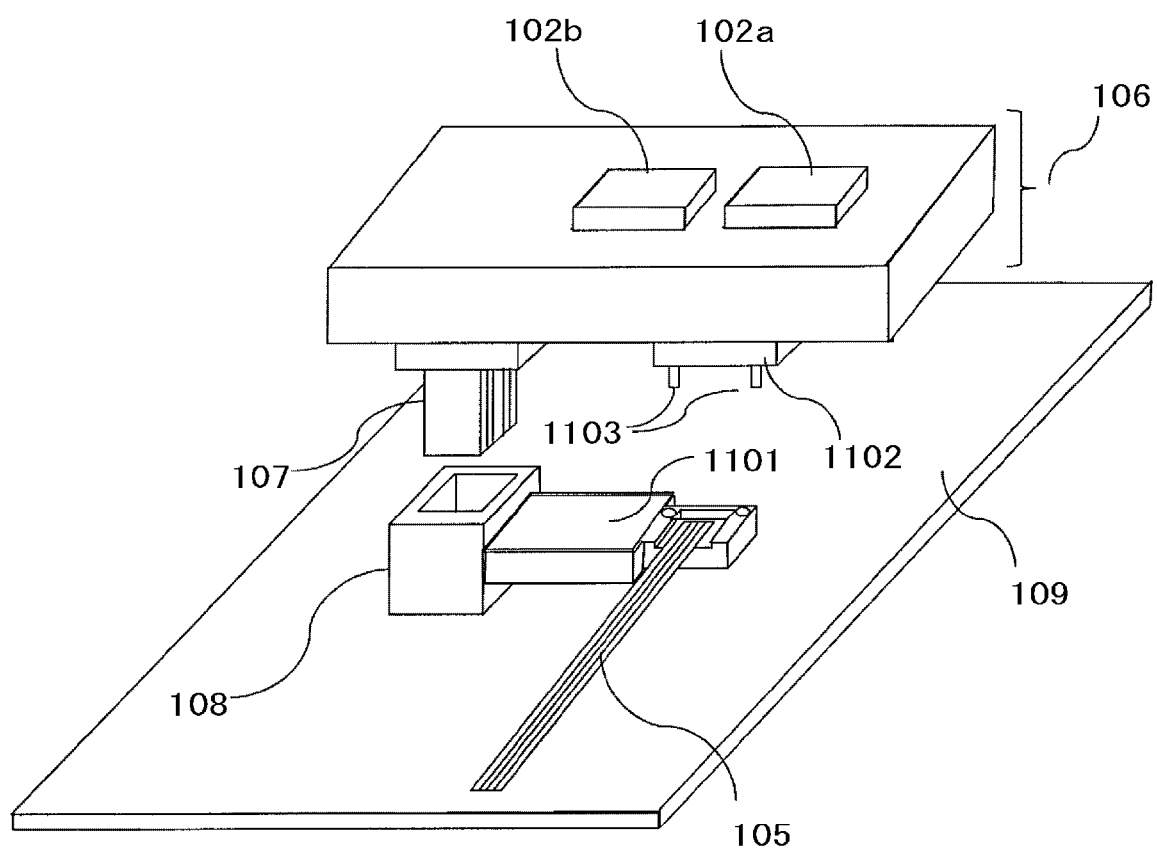

F I G . 1 4
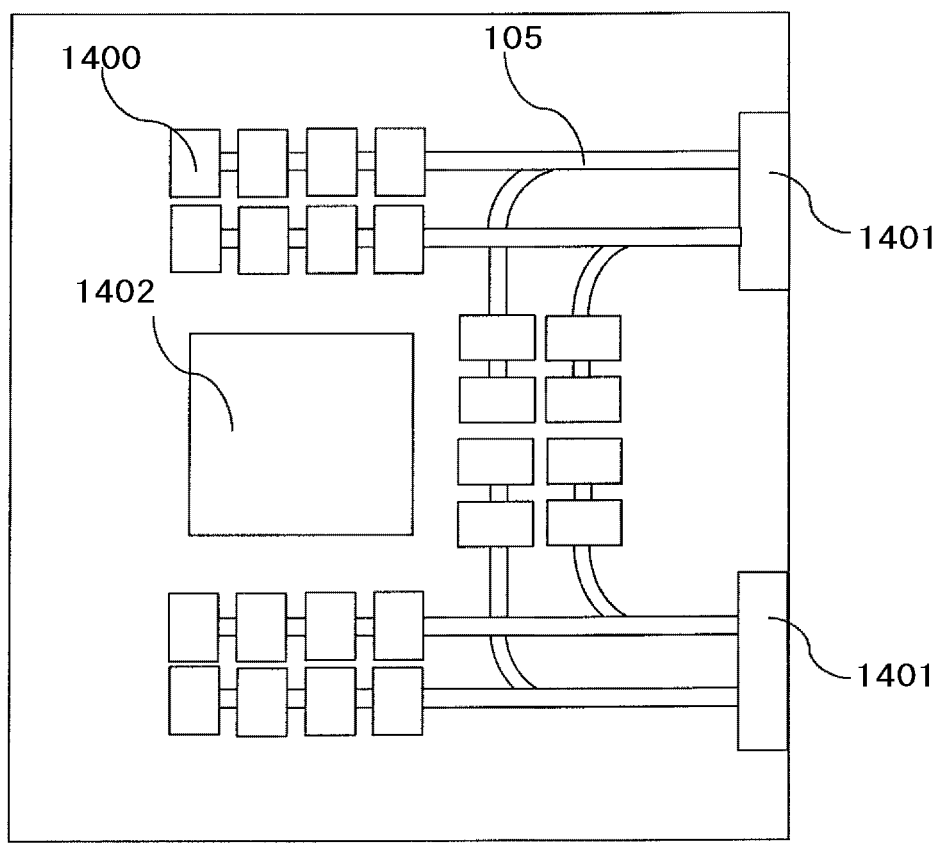

PHOTOELECTRIC CONVERSION MODULE AND TRANSMISSION APPARATUS USING THE SAME

CLAIM OF PRIORITY

The present application claims priority from Japanese patent application JP 2013-211345 filed on Oct. 8, 2013, the content of which is hereby incorporated by reference into this application.

BACKGROUND

The present invention relates to a photoelectric conversion module that allows signal transmission and processing equipment internally to process large amounts of signals, and to a transmission apparatus using the photoelectric conversion module.

In recent years, skyrocketing increases in the information processing capacity of servers and routers at data centers have urgently called for improved communication traffic. However, the existing high-speed communication via electric interconnects (electric wiring) is beginning to hit a wall. One measure currently under consideration to overcome the wall is the introduction of optical interconnect technology. With optical circuits reduced in size, with cost reduction techniques developed, and with optical devices and components reduced in cost, the optical interconnect technology is now nearing commercialization.

The optical interconnect technology is categorized into modes of inter-device transmission, intra-device transmission (backplane), and inter-chip transmission by the distance for signal transmission. Each of these modes of transmission has adopted electric transmission. However, given the demand for ever-higher transmission rates, the optical interconnect technology has started to be introduced into long-distance applications of transmission between nodes. The higher the rate of electric signal transmission, the greater the transmission losses involved resulting in reduced distances of transmission. Until now, the attempts to boost transmission rates have relied on the use of low-dielectric constant substrates and the addition of pre-emphasis circuits and equalizer circuits. However, even with these techniques deployed, the transmission rate and the transmission distance corresponding to backplane transmission are said to be limited to 10 Gbps and 1 m, respectively (see "The Latest Technology of Optical Transmitter-Receivers for Optical Interconnect Applications," by Ichiro Ogura, O plus E (Japanese publication), pp. 140-145, September, 2007).

In 2008, the transmission capacity of the backplane interconnecting the device boards of core routers and large-scale servers exceeded 1 Tbps. The transmission capacity is expected to increase 1.5 times annually in the years ahead. In 2014, transmission technology permitting transmission rates exceeding 20 Gbps will be needed, with the bandwidth of electric backplane severely limited. One way to circumvent the bottleneck of the electric backplane bandwidth being constrained is the expected introduction of optical backplane as mentioned above. Unlike electricity, light is incoherent. That means the narrower pitch between transmission lines will not incur crosstalk that is caused by interaction between the lines. Further, the loss of light caused by reflection and the transmission losses involved are not dependent on frequency and are thus easy to control. Thus amid the growing efforts to develop the optical interconnect technology, optical implementation of high-frequency transmission lines appears to have a higher potential to transmit large amounts of data than the existing arrangements of electric data transmission.

The photoelectric conversion modules developed so far for optical interconnect applications between intra-device boards are each made of an optical subassembly, an optical connector, and an electric connector. The optical connector permits optical coupling between an optical device incorporated in the optical subassembly and an optical transmission medium (optical fiber or optical waveguide). The electric connector provides electric coupling between electronic circuits included in the optical subassembly on the one hand and a device board on the other hand. Here, the device board refers to an interface board and a switchboard inside a transmission apparatus. The photoelectric conversion module is electrically coupled to the device board before being incorporated in the apparatus. The optical subassembly is made of an electric wiring substrate furnished with the optical device, a laser driver electronic circuit, and a transimpedance electronic circuit. The optical device includes a laser diode that emits an optical signal and a photodetector that converts the optical signal into an electric signal; the laser driver electronic circuit drives the laser diode to convert the electric signal into the optical signal; and the transimpedance electronic circuit amplifies the electric signal coming from the photodetector.

There are three existing types of photoelectric conversion modules that are mounted over the device board. The first type of module involves having the optical device, electronic circuits, and optical connector mounted over the top surface of the optical subassembly (i.e., the side opposite to the device board). The optical subassembly is inserted into the socket of an electric connector for two-dimensional electric wiring mounted over the device board, the optical subassembly being positioned in parallel with the surface of the device board (see http://www.avagonow.com/Newsletters/PDFs/EDN_0510_JP_01.pdf).

The second type of module involves having the optical device, electronic circuits, and optical connector mounted over the lower surface of the optical subassembly (i.e., the surface facing the device board). The optical subassembly is inserted into the socket of the electric connector for two-dimensional electric wiring mounted over the device board, the optical subassembly being positioned in parallel with the surface of the device board (see Japanese Unexamined Patent Application Publication No. 2012-60125). The optical fiber as the optical transmission medium is threaded through a window region forming part of the electric connector and extended outside.

The third type of module involves having the optical subassembly inserted into the socket of an electric connector for one-dimensional electric wiring mounted over the device board, the optical subassembly being positioned perpendicular to the device board (see http://pr.fujitsu.com/jp/news/2012/05/31.html).

SUMMARY OF THE INVENTION

The existing three types of photoelectric conversion modules, outlined above and used as mounted over the device board, have the following problems: one problem with the first type of photoelectric conversion module is that because the optical connector is mounted over the same surface carrying the electronic circuits and optical device that need to be cooled, a large radiator is difficult to use under space restrictions resulting in inefficient heat dissipation. Another problem is that with the optical device and the electronic circuits positioned close to one another over the same substrate surface, heat propagation from the electric circuits to the optical device can worsen the characteristics of the latter. However, if the optical device and the electronic circuits are located too far apart to avoid the effects of such heat propagation, signal propagation losses in the high-frequency electric wiring and the effects of reflection become conspicuous. A further problem is that if the modules of this type are arranged two-dimensionally, the optical fibers installed therebetween hamper cooling with a collective-type radiator. The problem with the second type of photoelectric conversion module is that if the modules of this type are arranged two-dimensionally over the device board, each module has only one window region through which to thread the optical fiber that cannot be extended due to the presence of adjacent modules. The problem with the third type of photoelectric conversion module is that because the optical subassembly is mounted upright over the device board, the module height is pronounced so that this module cannot be installed in a transmission apparatus in which the clearances between the device boards are small.

In view of the above circumstances, an object of the present invention is to provide a photoelectric conversion module that can be mounted two-dimensionally over the device board in a high-density, low-height manner and cooled efficiently with an easy-to-install collective-type radiator.

In achieving the above and other objects of the present invention, there are provided some embodiments thereof reflecting what is claimed in the appended claims in this application.

One such embodiment of the present invention is a photoelectric conversion module including: an optical subassembly that has an optical device and an electronic circuit mounted over an electric wiring substrate, the optical device emitting or receiving an optical signal, the electronic circuit driving the optical device to convert an electric signal into the optical signal or amplifying the electric signal converted from the optical signal; an optical connector that permits optical coupling between the optical device and an optical transmission medium for transmitting the optical signal; and an electric connector that permits electric coupling between the electric wiring substrate and a device board. The optical connector is mounted over that surface of the optical subassembly facing the device board. The electric connector has at least two sides thereof opened so that the optical transmission medium is threaded therethrough and extended through at least two facing sides of the optical subassembly. The optical transmission medium is extended between the optical subassembly and the device board in a vertically stacked manner.

Another embodiment of the present invention is a transmission apparatus having the above-mentioned photoelectric conversion modules arranged two-dimensionally over the device board, with a water-cooled or air-cooled collective-type radiator mounted over that surface of the optical subassembly opposite to the surface thereof carrying the optical connector.

The present invention thus provides a photoelectric conversion module that can be mounted two-dimensionally over the device board in a high-density, low-height manner and cooled efficiently with an easy-to-install collective-type radiator.

BRIEF DESCRIPTION OF THE DRAWINGS

Further objects and advantages of the present invention will become apparent upon a reading of the following description and appended drawings in which:

FIG. 11 is a diagram explaining an eighth embodiment of the present invention in which an electric connector and an optical connector are coupled collectively;

FIG. 14 is a diagram showing photoelectric conversion modules of the present invention typically arranged two-dimensionally over a transmission apparatus board.

DETAILED DESCRIPTION

Figure 1:
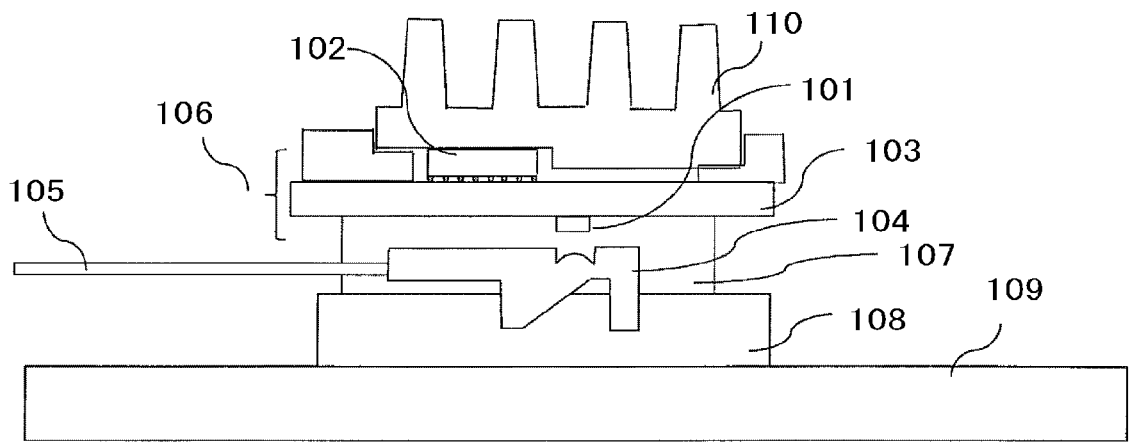
FIG. 1 is a cross-sectional view of a photoelectric conversion module as a first embodiment of the present invention.

The preferred embodiments of the present invention are explained below in detail with reference to the accompanying drawings. Throughout the drawings for explaining the embodiments, like reference characters designate like or corresponding parts, and their descriptions are omitted where redundant.

(First Embodiment)

A first embodiment of the present invention will now be described by referring to FIG. 1. The first embodiment is a photoelectric conversion module including: an optical subassembly that has an optical device and electronic circuit mounted over an electric wiring substrate, the optical device emitting or receiving an optical signal, the electronic circuit driving the optical device to convert an electric signal into the optical signal or amplifying the electric signal converted from the optical signal; an optical connector that permits optical coupling between the optical device and an optical transmission medium for transmitting the optical signal; and an electric connector that permits electric coupling between the electric wiring substrate and a device board. The optical connector is mounted over that surface of the optical subassembly facing the device board. The electric connector has at least two sides thereof opened so that the optical transmission medium is threaded therethrough and extended through at least two facing sides of the optical subassembly. The optical transmission medium is extended between the optical subassembly and the device board in a vertically stacked manner.

In FIG. 1, an optical device 101 (light emitter or photodetector) and an electronic circuit 102 (light emitter drive circuit or electric signal amplifier circuit) are each shown mounted as a flip chip over an electric wiring substrate 103. The electric wiring substrate 103 is made of an organic or alumina ceramic such as a glass-containing epoxy resin, or a material allowing the light from the light emitter to pass through. Of these light transmissive materials, silicon (Si) may be used as the material of the electric wiring substrate 103 where the wavelength of light is 850 nm. As the material of the optical device (light emitter or photodetector), the GaAs- or InP-based compound semiconductor or the Si or Ge semiconductor may be used. As the material of the electronic circuit, Si or SiGe may be utilized. An optical connector 104 furnished with a ribbon optical fiber 105 is attached to that surface of the electric wiring substrate 103 opposite to the surface thereof carrying the electronic circuit 102. The optical connector 104 is structured monolithically to integrate a reflector and a lens for changing an optical path by 90 degrees. This structure permits optical coupling between the optical fiber 105 and the optical device 101. The material of the optical connector 104 may be a resin such as ULTEM or glass. The optical fiber 105 may alternatively be an optical waveguide made of a polymer or the like. An electric connector 107 is a one-dimensional array type inline connector coupled to the electric wiring substrate 103.

The electric connector 107 is inserted into an electric connector socket 108 mounted over a device board 109 in the transmission apparatus. The insertion allows an optical subassembly 106 (made up of the optical device 101, electric circuit 102, and electric wiring substrate 103) having the optical connector 104 furnished with the ribbon optical fiber 105 to be mounted over the device board 109. In this case, the optical connector 104 is mounted over that surface of the electric wiring substrate 103 facing the device board 109, and the optical fiber 105 is threaded between the optical subassembly 106 and the device board 109. A radiator 110 is mounted over the surface of the optical assembly 106 carrying the optical device 101 and electric circuit 102. As the material of the radiator 110, a simple substance of tungsten or molybdenum having good thermal conductivity and a low thermal expansion coefficient, a compound material of tungsten or molybdenum with copper, or a compound material such as aluminum silicon carbide or aluminum nitride ceramics may be used. According to the structure of the photoelectric conversion module as the first embodiment shown in FIG. 1, a large radiator can be mounted over the electronic circuit that needs to be cooled without being hampered by the attachments of the optical connector. This structure provides highly efficient heat dissipation while keeping the optical module small in size.

(Second Embodiment)

Figure 2:
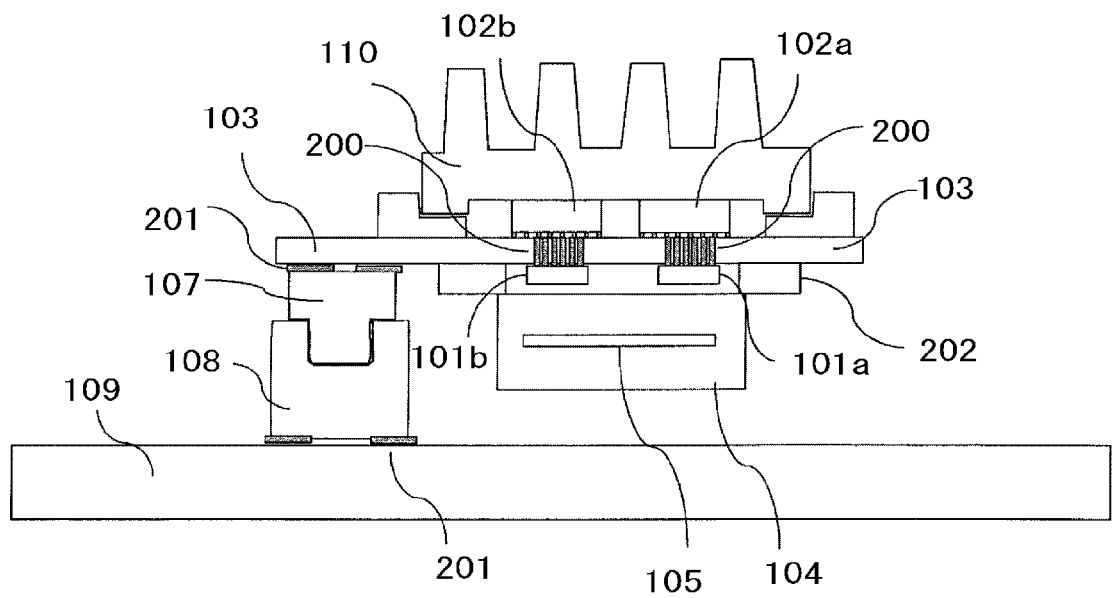
FIG. 2 is a cross-sectional view of a photoelectric conversion module as a second embodiment of the present invention.

FIG. 2 is a cross-sectional view of a photoelectric conversion module as a second embodiment of the present invention. The second embodiment differs from the first embodiment in the optical subassembly structure.

In this embodiment, at least either or both of an array of light emitters 101a having at least two channels (4 channels in this case) and an array of photodetectors 101b are mounted over that surface of the electric wiring substrate 103 facing the device board 109. Here, the light emitters 101a and the photodetectors 101b are installed in such a manner that the surface of the light emitters opposite to their light emitting surface and the surface of the photodetectors opposite to their light detecting surface come in contact with the surface of the electric wiring substrate 103. Meanwhile, a light emitter drive circuit 102a or an electric signal amplifier circuit 102b integrating an array of at least two channels is mounted as a flip chip over that surface of the electric wiring board 103 opposite to the device board 109. Also, as indicated in FIG. 2, vias 200 are provided between the optical device and the electronic circuit in the electric wiring substrate 103. After the array of light emitters 101a or the array of photodetectors 101b is mounted in the manner described above, the optical device is wire-bonded to the vias 200. This allows the optical device and electronic circuit to be electrically coupled by way of the electric wiring substrate 103. Also, the electric connector 107 is coupled to the electric wiring substrate 103 via electrode pads 201. Likewise, the electric connector socket 108 is coupled to the device board 109 via the electrode pads 201. Attaching the electric connector 107 of the optical subassembly to the electric connector socket 108 thus provides electric coupling between the optical device and electronic circuit on the one hand and the device board 109 on the other hand.

The optical connector 104 is mounted over that surface of the electric wiring substrate 103 facing the device board, with a spacer 202 inserted therebetween. In place of the spacer 202, a stagger may be provided over the electric wiring substrate 103, with the optical connector 104 mounted thereon. The optical connector 104 is an array optical connector furnished with a 12-channel ribbon optical fiber 105. In this embodiment, the array of light emitters 101a and the array of photodetectors 101b are each coupled optically with one ribbon optical fiber 105.

In the second embodiment, as in the first embodiment, the optical connector attachments do not pose any impediment to installing a radiator that permits highly efficient heat dissipation of the electronic circuits. Also, in the second embodiment, the optical device can be installed close to the optical connector 104, with each of the array of light emitters 101a and the array of photodetectors 101b collectively connectable to one ribbon optical fiber 105. This structure provides highly efficient optical coupling between the optical device and the optical fiber while minimizing the increase in the number of parts and in the number of processes involved.

(Third Embodiment)

Figure 3:
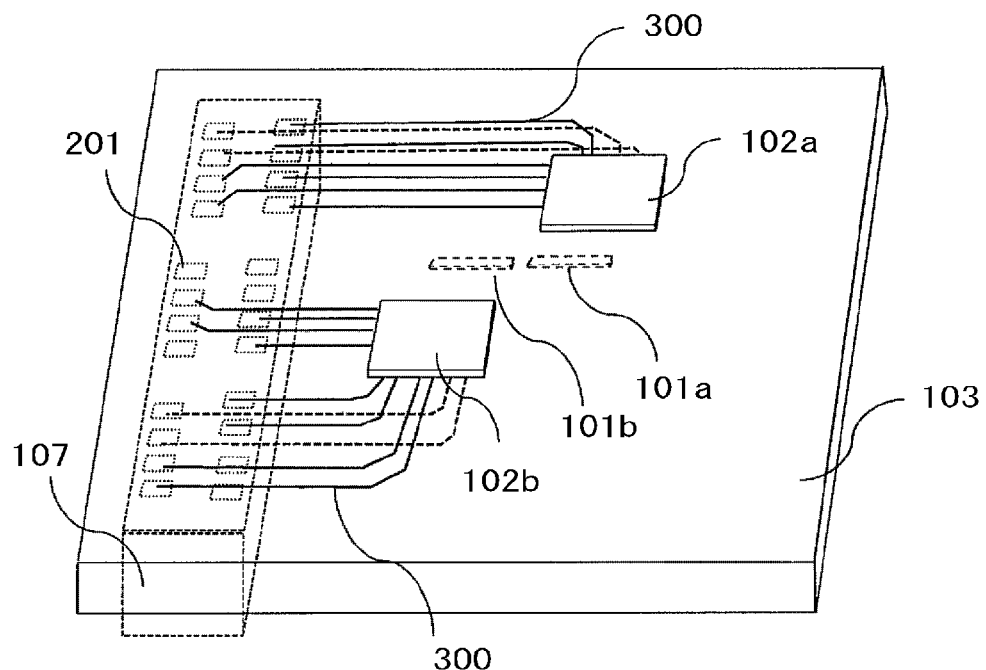
FIG. 3 is a top perspective view of a photoelectric conversion module as a third embodiment of the present invention.

FIG. 3 is a top perspective view of a photoelectric conversion module as a third embodiment of the present invention.

As shown in FIG. 3, the light emitter drive circuit 102a and electric signal amplifier circuit 102b are mounted over that surface of the electric wiring substrate 103 opposite to the device board. The light emitter 101a and photodetector 101b are attached to that surface of the electric wiring substrate 103 facing the device board 109, so that the optical device and electronic circuit are electrically coupled via the electric wiring substrate 103. In this embodiment, the light emitter drive circuit 102a and the electric signal amplifier circuit 102b are installed in a manner facing one another across a straight line connecting a light emitting part of the light emitter 101a with a light receiving part of the photodetector 101b. With this structure in which electric wiring 300 is extended from the light emitter drive circuit 102a and electric signal amplifier circuit 102b to the electrode pads 201 of the electric connector 107, it is possible to suppress the crosstalk between the electric wiring 300 of the light emitter drive circuit 102a and that of the electric signal amplifier circuit 102b, disperse the heat distribution of the electronic circuits, and diversify the wiring layout unlike in the case where the electronic circuits are to be arranged side by side. That in turn makes it possible to implement a photoelectric conversion module that permits good heat dissipation and offers high-frequency characteristics while remaining small in size.

(Fourth Embodiment)

Figure 4:
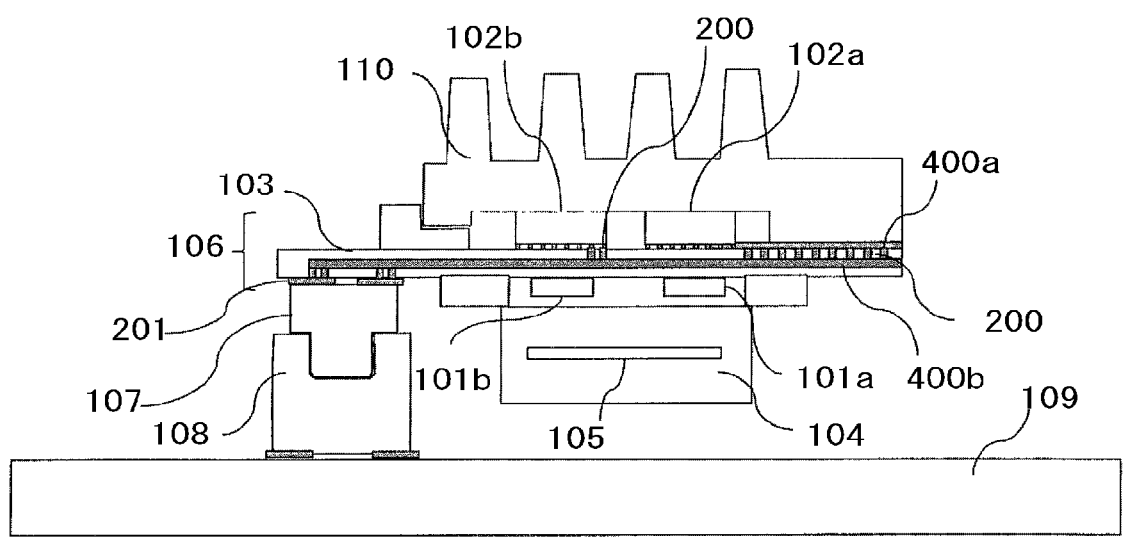
FIG. 4 is a cross-sectional view of a photoelectric conversion module as a fourth embodiment of the present invention.

FIG. 4 is a cross-sectional view of a photoelectric conversion module as a fourth embodiment of the present invention. As shown in FIG. 4, a radiator 110 is mounted over that surface of the optical subassembly 106 carrying the optical device and electronic circuit. In this embodiment, a metal pattern 400a for electrically coupling the light emitter drive circuit 102a to ground (GND) is formed in a direction opposite to that of the electric wiring for coupling the electronic circuit with the electric connector 107 over the electric wiring substrate 103. This is a structure in which the metal pattern 400a is in contact with the radiator 110. Likewise, a metal pattern 400b for electrically coupling the electric signal amplifier circuit 102b to ground (GND) passes through an internal layer of the electric wiring substrate 103 by way of vias 200 and is electrically coupled to the metal pattern 400a again through the vias 200.

As described above, the radiator 110 is in contact with the metal patterns 400a and 400b in a wide area where there is no signal wiring pattern and in a direction opposite to that of the electric wiring coupling the electronic circuit with the electric connector over the surface of the electric wiring substrate 103. This structure ensures the path of heat dissipation for the electronic circuit or the optical device and coming from the side of the electric wiring substrate 103 while reinforcing the sturdiness of substrate packaging.

(Fifth Embodiment)

Figure 5:
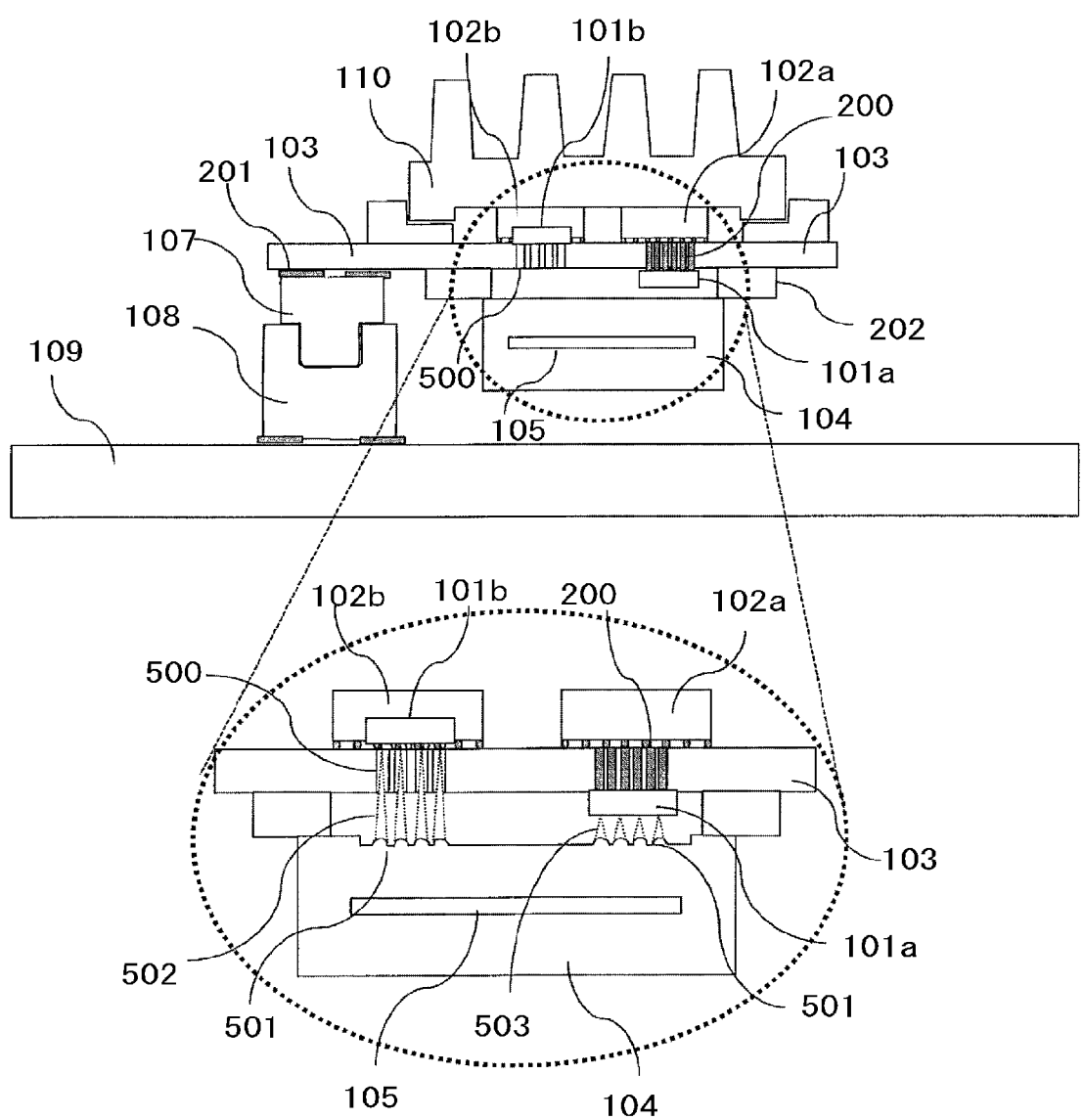
FIG. 5 is a cross-sectional view of a photoelectric conversion module as a fifth embodiment of the present invention.

FIG. 5 is a cross-sectional view of a photoelectric conversion module as a fifth embodiment of the present invention. In this embodiment, as shown in FIG. 5, an array of light emitters 101a is mounted over that surface of the electric wiring substrate 103 facing the device board 109, and an array of photodetectors 101b is mounted over that surface of the electric wiring substrate 103 opposite to the surface thereof facing the device board 109. Shown in the lower portion of FIG. 5 is a magnified view of an optical coupling part between the array of light emitters 101a and the array of photodetectors 101b on the one hand and the ribbon optical fiber 105 on the other hand. As indicated in the magnified view, the array of light emitters 101a and the array of photodetectors 101b are optically coupled to an array of optical fibers 105 via lenses 501 attached to the optical connector 104. An outgoing beam 502 from the ribbon optical fiber 105 is introduced into the array of photodetectors 101b by way of the lenses 501 and optical through-hole vias 500 provided in the electric wiring substrate 103. Also, the array of light emitters 101a adopts a surface-emitting laser (VCSEL) device used commonly in the light source device array.

Here, the numerical aperture (NA) of the outgoing beam 502 from the optical fiber is usually about 0.2, whereas the numerical aperture of an outgoing beam 503 from the VCSEL as the light emitter 101a is as large as 0.3 to 0.4. For this reason, if the light emitter 101a and photodetector 101b are arranged over the same surface of the electric wiring substrate 103, the optical distance between the ribbon optical fiber 105 and each of the optical devices becomes approximately the same. As a result, the difference in numerical aperture between the optical fiber and the light emitter (i.e., difference in beam divergence angle) makes it difficult to ensure highly efficient optical coupling. Thus in this embodiment, the VCSEL as the light emitter 101a having a larger numerical aperture than the optical fiber is mounted over that surface of the electric wiring substrate 103 close to the optical connector 104, and the photodetector 101b is mounted over the opposite surface. This structure minimizes the worsening of optical coupling efficiency attributable to the difference in numerical aperture (NA) between the light emitter and the optical fiber. Also, with this structure, an array of lenses having the same shape as that of the lens 501 attached to the optical connector 104 may be used in both the transmitter and the receiver. This helps reduce the number of parts and the number of processes involved.

(Sixth Embodiment)

The sixth embodiment of the present involves having multiple photoelectric conversion modules arranged.

Figure 6:
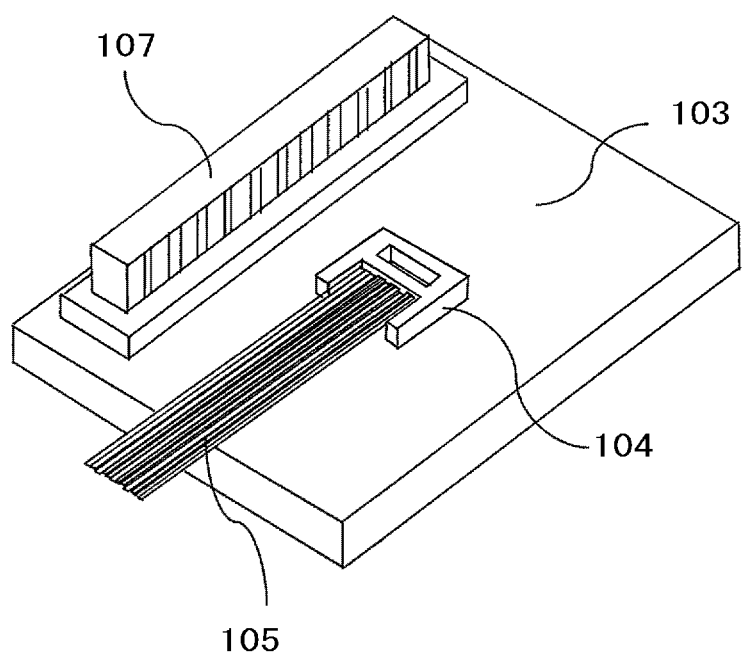
FIG. 6 is a perspective view showing the photoelectric conversion module of the first embodiment as viewed from the backside.
Figure 7:
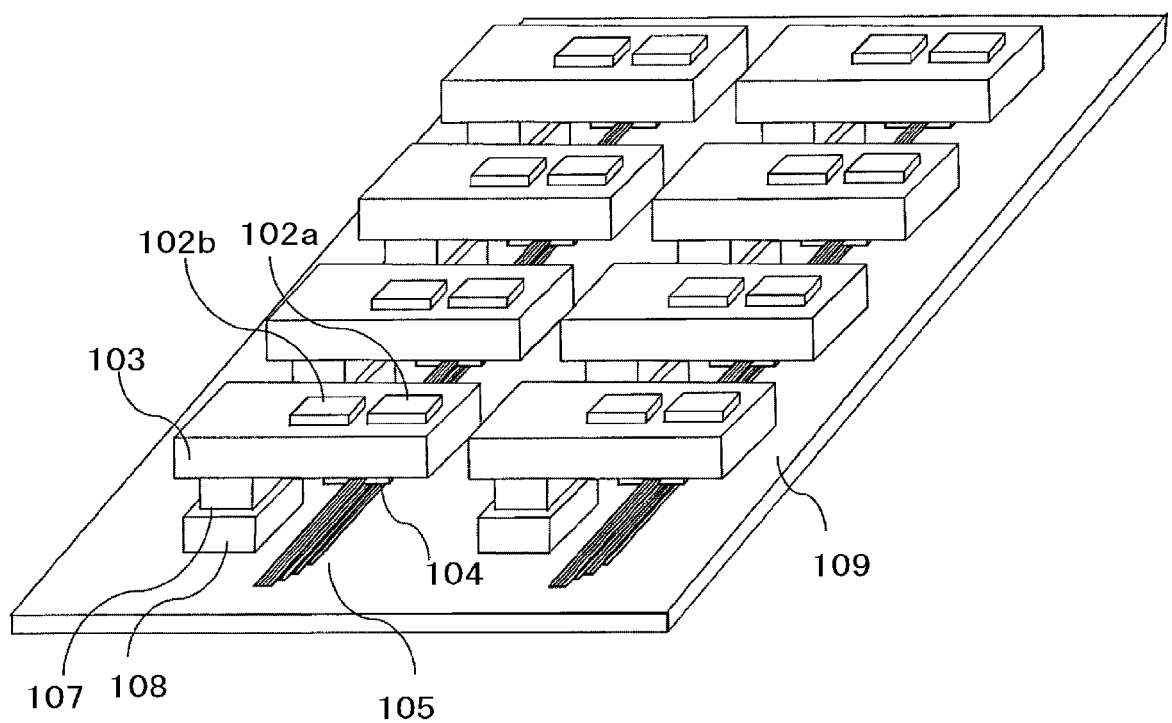
FIG. 7 is a perspective view showing photoelectric conversion modules of a sixth embodiment of the present invention arranged two-dimensionally over a device board.
Figure 8:
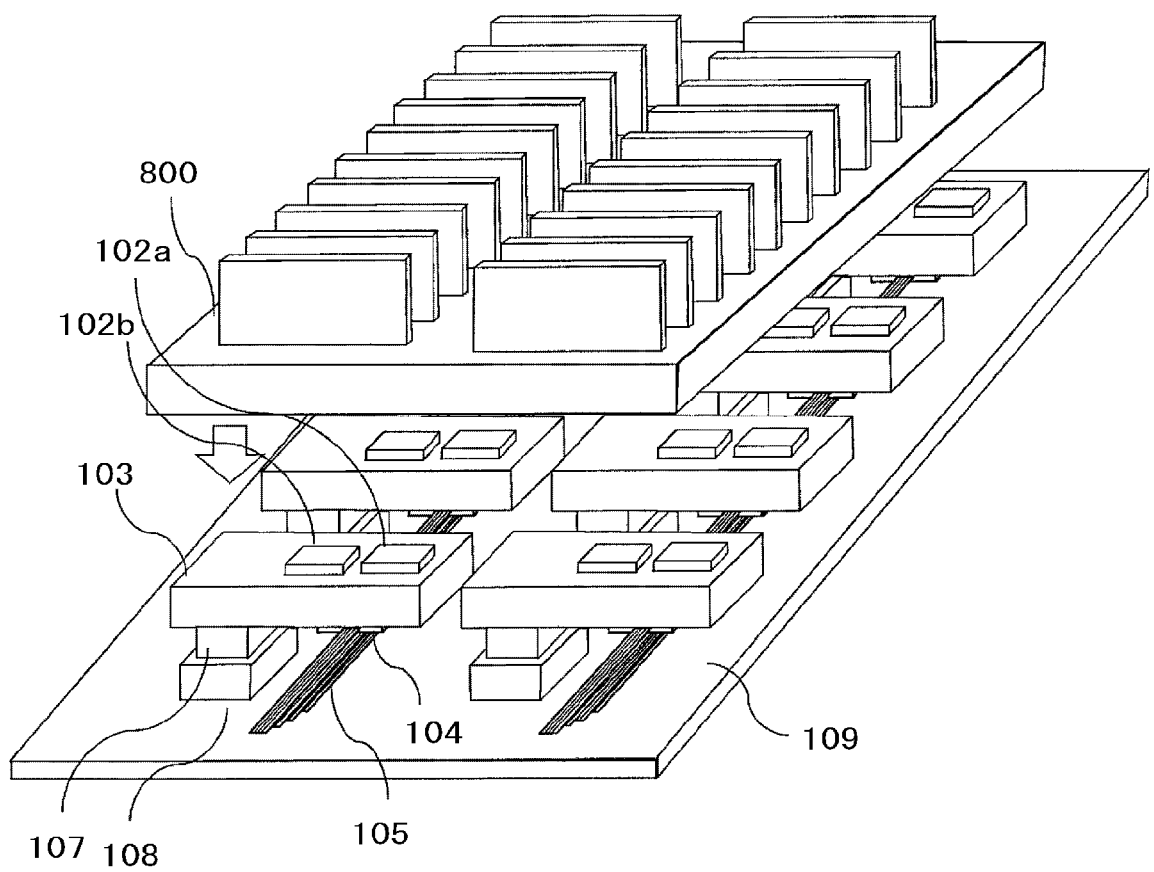
FIG. 8 is a perspective view showing photoelectric conversion modules of the sixth embodiment arranged two-dimensionally over the device board together with a collective-type radiator.
Figure 9:
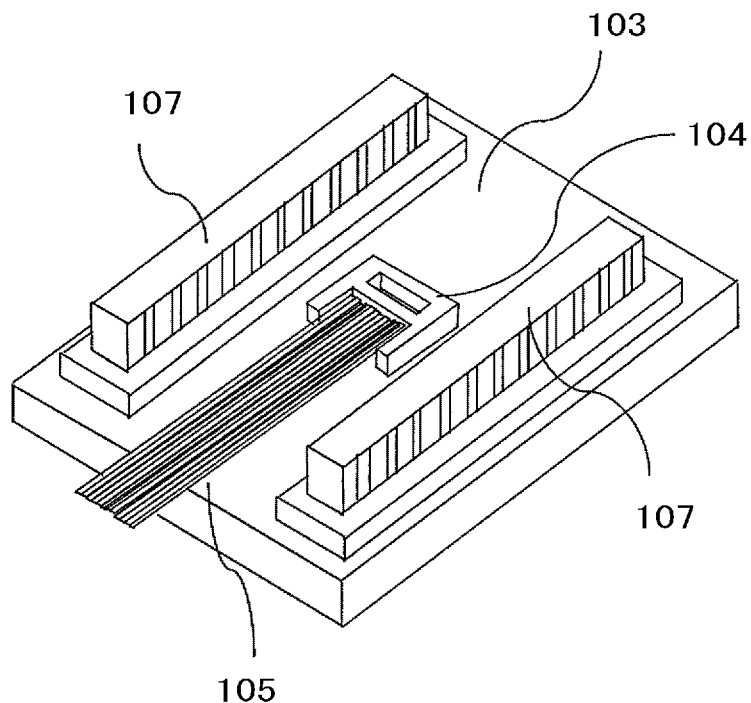
FIG. 9 is a perspective view showing a photoelectric conversion module as a variation of the present invention viewed from the backside.

FIG. 6 shows the photoelectric conversion module of the first embodiment as viewed from the backside. The electric connector 107 is installed in such a manner that its longitudinal direction is approximately in parallel with the ribbon optical fiber 105. The electric connectors 107 are arranged one-dimensionally, with three sides of the optical subassembly left open including the two facing sides so that, as shown in FIG. 7, the photoelectric conversion modules can be arranged two-dimensionally along with the optical fiber 105 installed as indicated. This permits high-density packaging over the device board 109. Furthermore, because there is neither optical connector nor optical fiber over the upper surface of the optical subassembly opposite to the device board 109, it is possible to set up an easy-to-install collective-type radiator 800 permitting highly efficient heat dissipation as shown in FIG. 8. Here, the collective-type radiator 800 may be water-cooled or air-cooled. In place of the setup shown in FIG. 6 where one electric connector is installed, the electric connector 107 may be supplemented with another electric connector positioned opposite to its counterpart across the optical connector 104 on the opposite side over the same surface of the electric wiring substrate 103, as indicated in FIG. 9. In the variation of FIG. 9, the two facing sides of the optical subassembly (i.e., two sides intersecting the longitudinal direction of the electric connectors) are left open so that the ribbon fiber from the adjacent photoelectric conversion module may be threaded therethrough. This structure permits two-dimensional arrangement of the photoelectric conversion modules as illustrated in FIG. 7.

(Seventh Embodiment)

Figure 10:
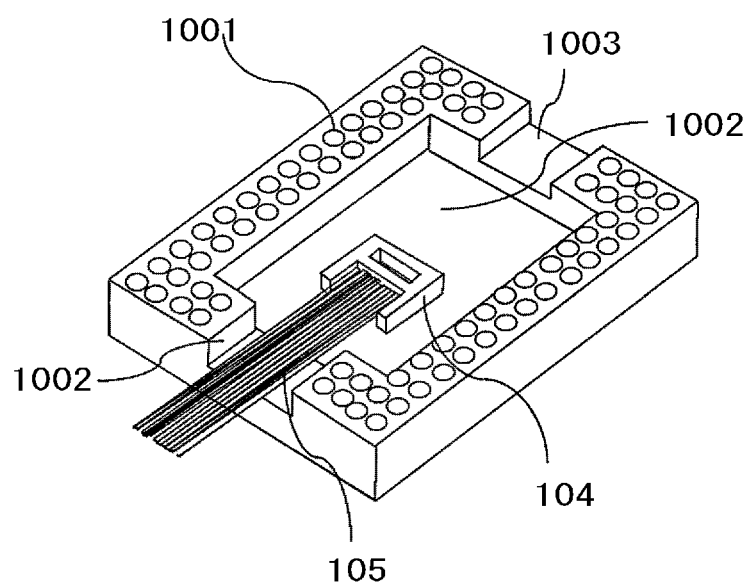
FIG. 10 is a perspective view showing a photoelectric conversion module of a seventh embodiment of the present invention as viewed from the backside.

FIG. 10 shows a photoelectric conversion module as a seventh embodiment of the present invention. The seventh embodiment differs from the first embodiment in the electric connector structure. FIG. 10 illustrates the electric connector as viewed from the backside.

An electric connector 1001 having electric pads two-dimensionally arranged thereon is adopted here as the electric connector. The electric connector 1001 is structured in a manner surrounding the optical connector 104. The electric connector 1001 has two window regions, i.e., a first window region 1002 and a second window region 1003, on two facing sides so that the ribbon optical fiber 105 and the ribbon optical fiber of the adjacent photoelectric conversion module are threaded therethrough. This structure allows the photoelectric conversion modules to be arranged two-dimensionally as shown in FIG. 7.

This embodiment offers the advantage of having more wires installed than with the electric connector 107 having the electric pads arranged one-dimensionally thereon as explained in connection with the first embodiment.

(Eighth Embodiment)

FIG. 11 shows a photoelectric conversion module as an eighth embodiment of the present invention. The eighth embodiment is a photoelectric conversion module in which the optical connector is fixed to the electric connector socket mounted on the device board so that the electric connector and the optical connector socket attached to the optical subassembly may be coupled with their counterparts collectively.

An optical connector 1101 bonded by adhesive to the electric connector socket 108 or fitted thereto using guide pins or the like is mounted over the device board 109. Thereafter, the optical assembly 106 furnished with the electric connector 107 and an optical connector socket 1102 is mounted in such a manner that the electric connector 107 aligned with the electric connector socket 108 and the optical connector 1101 aligned with the optical connector socket 1102 are fitted to their counterparts collectively. The optical connector 1101 and the optical connector socket 1102 are fitted to one another by means of guide pins 1103.

This embodiment reduces the number of processes in which to mount the photoelectric conversion module over the device board, thereby facilitating the work involved.

(Ninth Embodiment)

Figure 12:
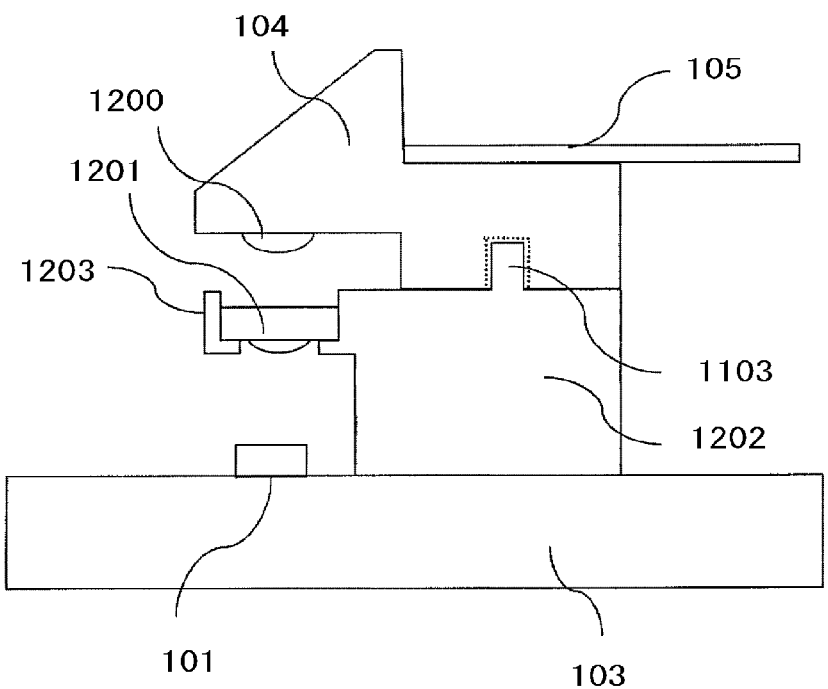
FIG. 12 is a diagram explaining a ninth embodiment of the present invention in which an optical connector and an optical connector socket are arranged to permit easy change of the optical fiber height.
Figure 13:
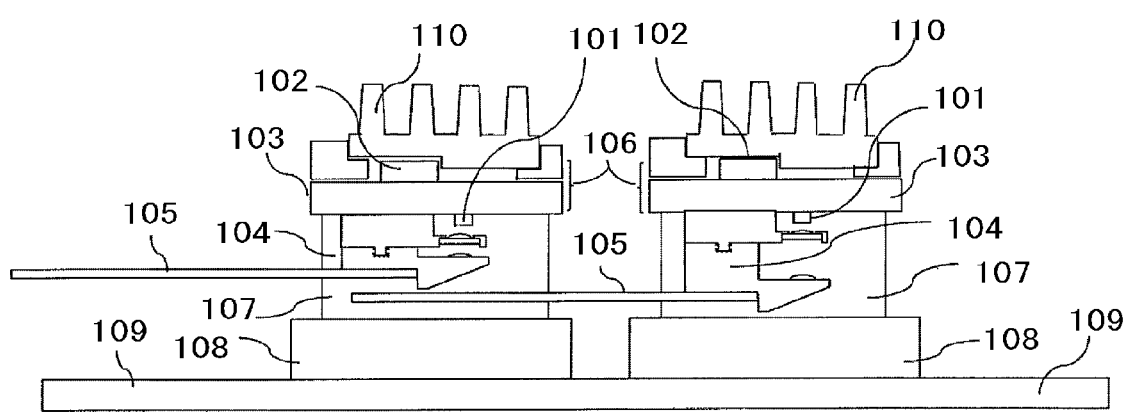
FIG. 13 is a cross-sectional view of the ninth embodiment in which photoelectric conversion modules each furnished with an optical connector and an optical connector socket are arranged.

FIGS. 12 and 13 show a photoelectric conversion module as a ninth embodiment of the present invention. FIG. 12 is a diagram explaining how an optical connector and an optical connector socket are arranged to permit easy change of the optical fiber height. FIG. 13 is a cross-sectional view showing how photoelectric conversion modules each furnished with the optical connector and optical connector socket indicated in FIG. 12 are arranged. The ninth embodiment is a photoelectric conversion module in which an optical coupling part permitting optical coupling between the optical device and the optical transmission medium is structured to include an optical connector socket having a lens holder for a first lens, and an optical connector having a second lens and an optical path changing mirror. The light emitted from or incident on the second lens is substantially parallel light.

An optical connector socket 1202 is made up of a lens holder 1203 for holding a first lens 1201 and a guide pin 1103. The optical connector 104 is comprised of a second lens 1200, an optical path changing mirror, and a V-groove structure for optical fiber installation. The V-groove structure may be replaced with a hole through which the optical fiber is threaded. The first lens on the side of the optical device 101 condenses light to permit highly efficient optical coupling with another optical device. Meanwhile, the second lens of the optical connector 104 is designed so that the light emitted from or incident on the second lens becomes approximately parallel light. In this case, even if the distance between the first lens 1201 and the second lens 1200 is varied significantly, any change in the efficiency of optical coupling with the optical device is expected to be small. As a result, the thickness of the optical connector 104 may be varied significantly, so that the height of the optical fiber 105 over the device board may be changed as needed.

When such a photoelectric conversion module in which the optical fiber 105 is varied in height is mounted over the device board 109, the optical fiber of the module can be extended without being hampered by the optical fiber of an adjacent photoelectric conversion module as shown in FIG. 13. If the distance between the optical connector and the device board is set to be 3 mm and the diameter of the optical fiber sheathing is set to be 0.25 mm, up to 12 optical fibers can be stacked one on top of the other.

(Tenth Embodiment)

FIG. 14 shows an embodiment of a transmission apparatus that uses the photoelectric conversion modules according to the present invention. As indicated in FIG. 14, around an LSI 1402 over the device board 109, the photoelectric conversion modules 1400 of this invention are arranged two-dimensionally. The optical fiber of each of the photoelectric conversion modules 1400 is extended between the module and the device board and coupled to a backplane optical connector 1401.

When signal transmission between the device boards is performed using optical signals in the manner discussed above, it is possible to implement a transmission apparatus offering an enhanced signal processing capability.

As many apparently different embodiments of this invention may be made without departing from the spirit and scope thereof, it is to be understood that the invention is not limited to the specific embodiments thereof except as defined in the appended claims.

What is claimed is:

1. A photoelectric conversion module comprising:
   an optical subassembly that has an optical device and an electronic circuit mounted over an electric wiring substrate, the optical device emitting or receiving an optical signal, the electronic circuit driving the optical device to convert an electric signal into the optical signal or amplifying the electric signal converted from the optical signal;
   an optical connector that permits optical coupling between the optical device and an optical transmission medium for transmitting the optical signal; and
   an electric connector, consisting of a plug and a receptacle part, that permits electric coupling between the electric wiring substrate and a device board;
   wherein the optical connector is mounted over that surface of the optical subassembly facing the device board;
   wherein, when the plug and the receptacle part are combined, the electric connector is opened so that the optical transmission medium is threaded therethrough and extended through at least two sides of the electric connector facing the optical subassembly; and
   wherein the optical transmission medium is extended between the optical subassembly and the device board in a vertically stacked manner.

2. The photoelectric conversion module according to claim 1,
   wherein the electronic circuits having at least two channels are mounted over that surface of the electric wiring substrate opposite to the surface thereof facing the device board; and
   wherein at least either of the optical devices having at least two channels for emitting or receiving the optical signal is mounted over that surface of the electric wiring substrate different from the surface thereof carrying the electronic circuits.

3. The photoelectric conversion module according to claim 2,
   wherein, of the electronic circuits mounted over the electric wiring substrate, the electronic circuit for driving the optical device to convert the electric signal into the optical signal and the electronic circuit for amplifying the electric signal converted from the optical signal are installed in a manner facing one another across a straight line connecting light emitting parts or light receiving parts of at least two of the optical devices.

4. The photoelectric conversion module according to claim 2,
   wherein a radiator for heat dissipation of the electronic circuits is mounted over the same surface of the electric wiring substrate carrying the electronic circuits; and
   wherein a metal pattern coupled electrically with the electronic circuits and ground is formed over the electric wiring substrate, the radiator being in contact with the metal pattern.

5. The photoelectric conversion module according to claim 1,
wherein the optical device for emitting or receiving the optical signal is an array of light emitters or an array of photodetectors, each of the arrays having at least two channels;
wherein the optical connector is an array of optical connectors furnished with the optical transmission medium having at least four channels; and
wherein at least either the array of light emitters or the array of photodetectors is optically coupled with an array of optical fibers.

6. The photoelectric conversion module according to claim 5,
wherein the array of light emitters is mounted over that surface of the electric wiring substrate facing the device board, and the array of photodetectors is mounted over that surface of the electric wiring substrate opposite to the surface thereof facing the device board.

7. The photoelectric conversion module according to claim 1,
wherein the electric connector is attached to one side of the optical subassembly so that the electric connector is substantially in parallel with the optical transmission medium.

8. The photoelectric conversion module according to claim 1,
wherein the plug and the receptacle part face the optical subassembly so that the plug and the receptacle part are substantially in parallel with the optical transmission medium.

9. The photoelectric conversion module according to claim 1,
wherein the electric connector is structured to surround the optical connector; and
wherein at least two facing sides of the electric connector have at least two window regions through which the optical transmission medium is threaded.

10. The photoelectric conversion module according to claim 9,
wherein the electric connector has electric pads arranged two-dimensionally thereon.

11. The photoelectric conversion module according to claim 1,
wherein an electric connector socket to which the optical connector is fixed is furnished on the device board; and
wherein the electric connector and an optical connector socket are furnished on the optical subassembly so that the electric connector and the optical connector are coupled collectively.

12. The photoelectric conversion module according to claim 1,
wherein an optical coupling part for permitting optical coupling between the optical device and the optical transmission medium includes a first lens, an optical connector socket having a lens holder for holding the first lens, and an optical connector having a second lens and an optical path changing mirror; and
wherein the light emitted from or incident on the second lens is substantially parallel light.

13. The photoelectric conversion module according to claim 12,
wherein the thickness of the optical connector is varied among a plurality of photoelectric conversion modules.

14. A transmission apparatus comprising the photoelectric conversion modules according to claim 1,
wherein the photoelectric conversion modules are arranged two-dimensionally over the device board; and
wherein a water-cooled or air-cooled collective-type radiator is mounted over that surface of the optical subassembly opposite to the surface thereof carrying the optical connector.

* * * * *